(12) United States Patent
Mangalassery Gregory et al.

(10) Patent No.: US 11,449,822 B2
(45) Date of Patent: Sep. 20, 2022

(54) AUTOMATIC DETERMINATION OF A SHIPPING SPEED TO DISPLAY FOR AN ITEM

(71) Applicant: Walmart Apollo, LLC, Bentonville, AR (US)

(72) Inventors: Sony Mangalassery Gregory, Foster City, CA (US); Vimal Mohan Kothanath, Mountain View, CA (US); Sindiri Sai Kumar, Bengaluru (IN); Shantanu Preetam, Bengaluru (IN); Yuvaraj MukariKrishnamoorthy, Kanchipuram (IN); Yatin Gupta, Haridwar (IN); Sandip Mahanta, Bengaluru (IN)

(73) Assignee: WALMART APOLLO, LLC, Bentonville, AR (US)

( * ) Notice: Subject to any disclaimer, the term of this patent is extended or adjusted under 35 U.S.C. 154(b) by 828 days.

(21) Appl. No.: 16/189,884

(22) Filed: Nov. 13, 2018

(65) Prior Publication Data
US 2020/0151659 A1 May 14, 2020

(51) Int. Cl.
*G06Q 10/08* (2012.01)
*G06F 16/29* (2019.01)

(52) U.S. Cl.
CPC ......... *G06Q 10/0833* (2013.01); *G06F 16/29* (2019.01); *G06Q 10/08355* (2013.01)

(58) Field of Classification Search
CPC .......... G06Q 10/0833; G06Q 10/08355; G06F 16/29
(Continued)

(56) References Cited

U.S. PATENT DOCUMENTS 7,590,563 B1  9/2009  Ward et al.
7,617,133 B1  11/2009  Antony et al.
(Continued)

FOREIGN PATENT DOCUMENTS

WO    WO-0068859 A2  *  11/2000  ......... G06Q 10/0631

OTHER PUBLICATIONS

Acharya, Sopnamayee. "Vehicle Routing and Scheduling Problems with time window constraints—Optimization based models" International Journal of Mathematical Sciences and Applications vol. 3 No. 1. https://citeseerx.ist.psu.edu/viewdoc/download?doi=10.1.1.1068.7528&rep=rep1&type=pdf (Year: 2013).*

(Continued)

*Primary Examiner* — Shannon S Campbell
*Assistant Examiner* — Lisa Ma
(74) *Attorney, Agent, or Firm* — Bryan Cave Leighton Paisner LLP

(57) ABSTRACT

A method including determining a zip code of a user using a website that displays items. The method also can include receiving a selection by the user to display information about an item of the items. The method additionally can include retrieving first information including a predetermined geo-classification for the item. The method further can include retrieving second information including a list of fulfillment nodes that can currently deliver to the zip code of the user within a first shipping speed via ground shipping. The method additionally can include retrieving third information including a node-level inventory for the item. The method further can include determining a shipping speed to display to the user for the item based on (a) the predetermined geo-classification for the item, (b) the list of fulfillment nodes that can currently deliver to the zip code of the user within the first shipping speed, and (c) the node-level inventory for the item. The method additionally can include (Continued)

facilitating a display of the shipping speed to the user. Other embodiments are disclosed.

20 Claims, 6 Drawing Sheets

(58) Field of Classification Search
USPC .......................................................... 705/333
See application file for complete search history.

(56) References Cited

U.S. PATENT DOCUMENTS

| | | | |
|---|---|---|---|
| 9,047,607 B1* | 6/2015 | Curial | G06Q 30/00 |
| 9,959,562 B1* | 5/2018 | Ackerman | G06Q 30/0631 |
| 10,489,841 B1* | 11/2019 | Ogborn | G06Q 30/0629 |
| 2011/0225023 A1 | 9/2011 | Evens et al. | |
| 2011/0320034 A1 | 12/2011 | Dearlove et al. | |
| 2011/0320376 A1 | 12/2011 | Dearlove et al. | |
| 2013/0325741 A1 | 12/2013 | Smalling et al. | |
| 2015/0193784 A1* | 7/2015 | Gao | G06Q 30/0619 705/7.29 |
| 2016/0078399 A1 | 3/2016 | Gadre et al. | |
| 2016/0110681 A1 | 4/2016 | Brereton et al. | |
| 2016/0328781 A1 | 11/2016 | Patel-Zellinger et al. | |
| 2017/0083967 A1 | 3/2017 | Shiely et al. | |
| 2017/0124511 A1 | 5/2017 | Mueller et al. | |
| 2017/0206500 A1 | 7/2017 | Deshpande et al. | |
| 2017/0277694 A1 | 9/2017 | Spathelf et al. | |
| 2018/0012158 A1 | 1/2018 | Cholewinski et al. | |
| 2018/0204168 A1 | 7/2018 | Ganesh et al. | |

OTHER PUBLICATIONS

Muñoz-Villamizar, Andrés. "The environmental impact of fast shipping ecommerce in inbound logistics operations: A case study in Mexico" Journal of Cleaner Production, vol. 283. https://www.sciencedirect.com/science/article/pii/S0959652620354469 (Year: 2021).*

* cited by examiner

US 11,449,822 B2

1

AUTOMATIC DETERMINATION OF A SHIPPING SPEED TO DISPLAY FOR AN ITEM

TECHNICAL FIELD

This disclosure relates generally to automated determination of fulfillment nodes eligible for a specified shipping speed and whether to display a specified shipping speed for an item.

BACKGROUND

Users purchasing products from an online retailer are often able to choose different shipping speeds for their orders as part of a service level agreement with the online provider. For example, users often can choose between 1-day shipping, 2-day shipping, and/or 3 to 5-day shipping. The cost of shipping an item can vary depending on various factors, such as the location from which the item is to be shipped, the location to which the item is to be shipped, and/or the mode of shipment (e.g., ground shipment, air shipment, etc.).

BRIEF DESCRIPTION OF THE DRAWINGS

To facilitate further description of the embodiments, the following drawings are provided in which.

Figure 1:
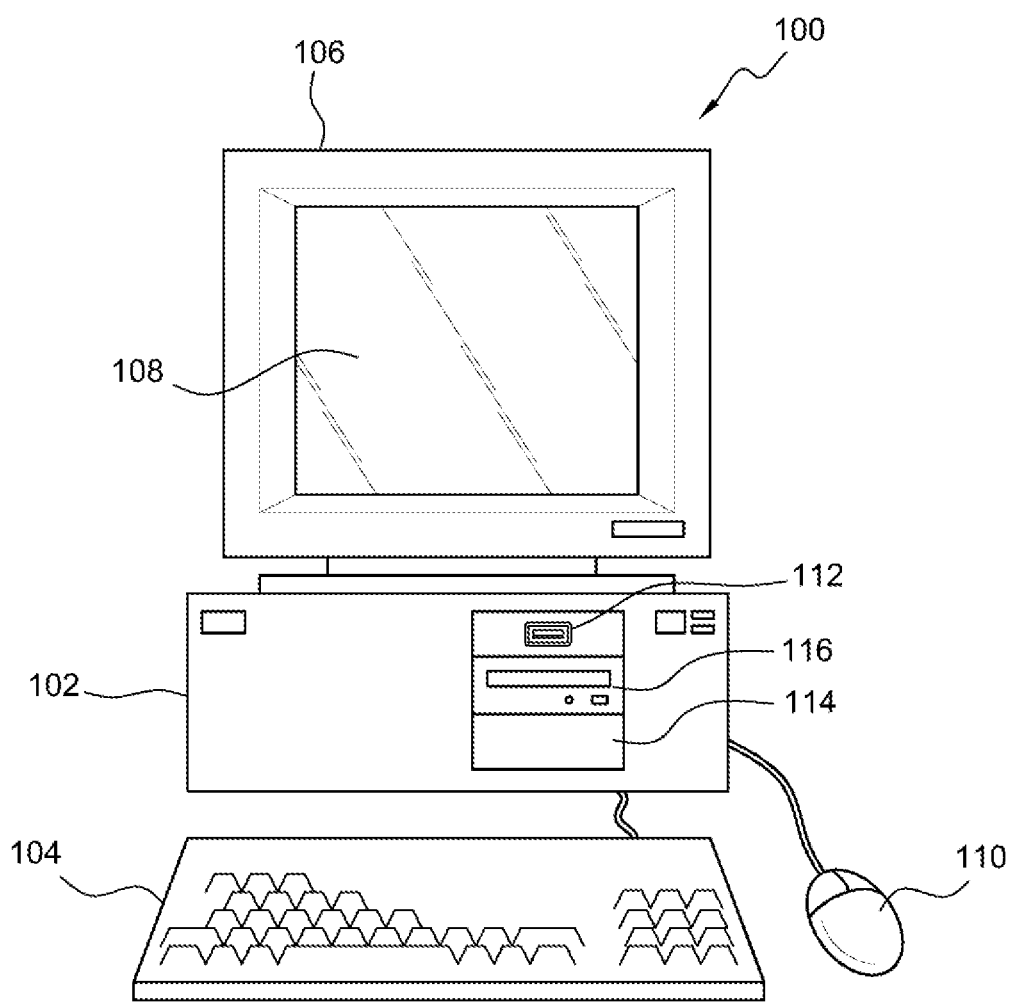
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
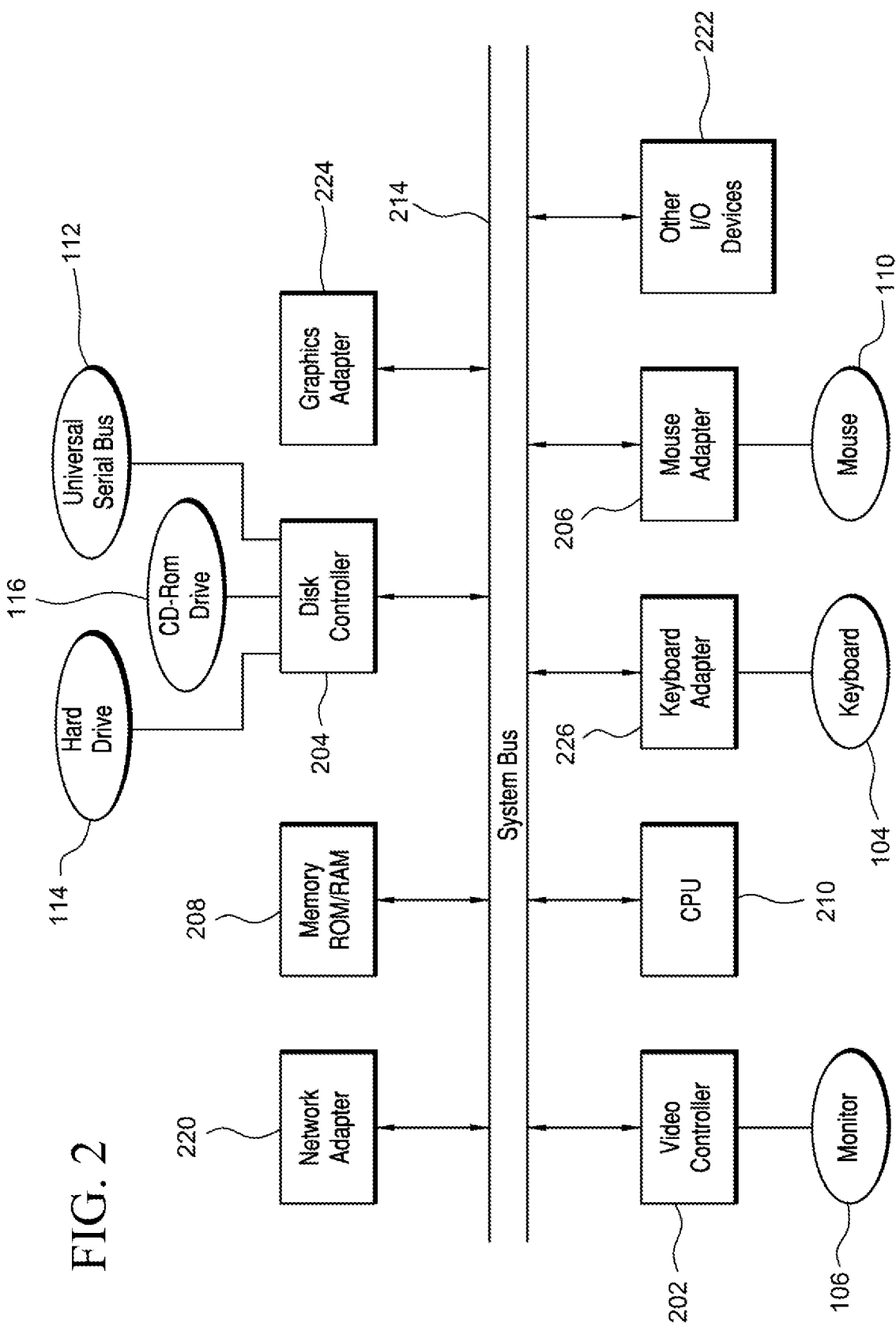
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) upled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
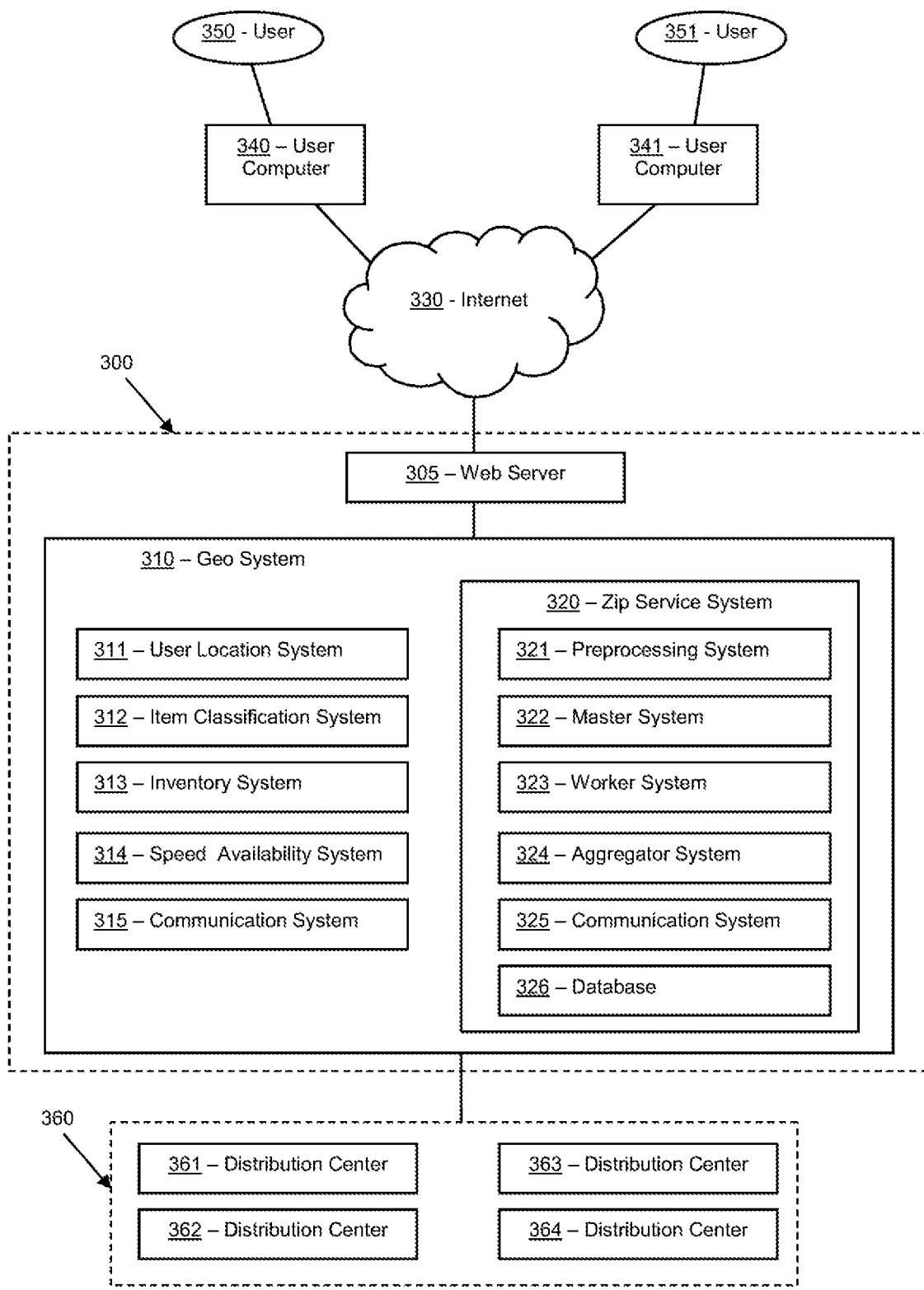
FIG. 3 illustrates a block diagram of a system that can be employed for automatic determination of fulfillment nodes eligible for a specified shipping speed and/or automatic determination of a shipping speed to display for an item, according to an embodiment.

Turning ahead in the drawings, FIG. 3 illustrates a block diagram of a system 300 that can be employed for automatic determination of fulfillment nodes eligible for a specified shipping speed and/or automatic determination of a shipping speed to display for an item, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a web server 305 and/or a geo system 310. Web server 305 and/or geo system 310 can each be a computer system, such as computer system 100 (FIG. 1), as described above, and can each be a single computer, a single server, or a cluster or collection of computers or servers, or a cloud of computers or servers. In another embodiment, a single computer system can host web server 305 and/or geo system 310. Additional details regarding web server 305 and/or geo system 310 are described herein.

In some embodiments, web server 305 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, web server 305 can host one or more websites. For example, web server 305 can host a website that allows users to browse and/or search for items (e.g., products), to add items to an electronic cart, and/or to purchase items, in addition to other suitable activities.

In some embodiments, an internal network that is not open to the public can be used for communications between web server 305 and geo system 310 within system 300. Accordingly, in some embodiments, geo system 310 (and/or the software used by such systems) can refer to a back end of system 300 operated by an operator and/or administrator of system 300, and web server 305 (and/or the software used by such systems) can refer to a front end of system 300, as can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, web server 305 and/or geo system 310 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to web server 305 and/or geo system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of web server 305 and/or geo system 310. In a similar manner, the processors and/or the non-transitory computer-readable media can be local and/or remote to each other.

Meanwhile, in many embodiments, web server 305 and/or geo system 310 also can be configured to communicate with and/or include one or more databases, such a database 326, and/or other suitable databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between web server 305, geo system 310, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, a business group that operates a website, such as the website hosted by web server 305 can operate a fulfillment network 360. In various embodiments, fulfillment network 360 can include one or more distribution centers (also referred to as fulfillment nodes, fulfillment centers, or distributors), such as distribution centers 361-364. In various embodiments, there can be 5, 10, 15, 20, 30, 40, 50, or another suitable number of distribution centers. In various embodiments, the items available for ordering through web server 305 can by housed at one or more of the distribution centers (e.g., 361-364) of fulfillment network 360. In many embodiments, stock keeping units (SKUs) can be used to track each unique item. An online order for an item submitted by user (e.g., 350-351) can result in a shipment to the user (e.g., 350-351) from one of the distribution centers (e.g., 361-364). Often times, one or more of the distribution centers (e.g., 361-364) can each have a limited capacity and can carry some of the items, but not all of the items, that are available for sale through web server 305. As such, stocking every item at every distribution center (e.g., 361-364) of fulfillment network 360 can be unfeasible, so certain items can be available at some, but not at others, of the distribution centers (e.g., 361-364). The assortment of items stocked at various distributions centers (e.g., 361-364) across fulfillment network 360 and/or the physical location of the users (e.g., 350-351) can affect the shipping options available and/or the cost of shipping the items to the users (e.g., 350-351).

Users (e.g., 350-351) often do not want to pay an extra amount for shipping beyond the price of the item. When the costs of shipping are absorbed in the price charged for the item, profit margins can be increased by minimizing shipping costs. When purchasing an item, users (e.g., 350-351) often prefer to receive assurances about how soon the item can be delivered. The user (e.g., 350-351) are typically able to choose different shipping speeds for their orders as part of a service level agreement (SLA) with the provider of the website. For example, users (e.g., 350-351) often can choose between 1-day shipping, 2-day shipping, and/or 3 to 5-day shipping. The cost of shipping an item can vary depending on various factors, such as the location from which the item is to be shipped, the location to which the item is to be shipped, the mode of shipment (e.g., ground shipment, air shipment, etc.). For example, if the website lists an item as being available with free 2-day shipping (e.g., with no shipping charge for the two-day delivery), the cost of shipping the item in two days can be lower if the item is shipped by ground shipment to the user (e.g., 350-351) from a distribution center (e.g., 361-364) that is located closer to the user than if the item is shipped by air shipment to the user (e.g., 350-351) from a distribution center that is located farther away from the user.

Some providers offer a membership program that charges users an annual or monthly fee in exchange for offering many of the items on the website with a free two-day shipping option. The membership program is used to help cover the increased costs that arise from offering free two-day shipping. Other providers do not charge for a membership program, but nonetheless make many items available with a free two-day shipping option. In order to limit shipping costs and be profitable, it can be challenging to determine which items to make available with a free two-day shipping option, when to make the option available on these items, and/or to which users (e.g., 350-351) the option will be made available, particularly as the scale involves a fulfillment network (e.g., 360) with many distribution centers (e.g., 361-364), such as more than 15 distribution centers, that collectively carry a very large number of unique items (e.g., millions of unique items). In a number of embodiments, geo system 310 can be used to curate the assortment of items made available on the website and the shipping speed at which the items are offered, based on the location of the user (e.g., 350-351) and/or a real-time available of the inventory of items.

In many embodiments, geo system 310 can include various systems and/or components. Geo system 310 is merely exemplary and is not limited to the embodiments presented herein. Geo system 310 can be employed in many different embodiments or examples not specifically depicted or described herein. In some embodiments, certain elements or system of geo system 310 can perform various procedures, processes, and/or acts. In other embodiments, the procedures, processes, and/or acts can be performed by other suitable elements or systems. In many embodiments, the systems of geo system 310 can be modules of computing instructions (e.g., software modules) stored at non-transitory computer readable media that operate on one or more processors. In other embodiments, the systems of geo system 310 can be implemented in hardware. In many embodiments, geo system 310 can include a user location system 311, an item classification system 312, an inventory system 313, a speed availability system 314, a communication system 315, and/or a zip service system 320.

In some embodiments, user location system 311 can provide a location of the user (e.g., 350-351). In many embodiments, the location of the user (e.g., 350-351) can be represented by a zip code for the address at which the user (e.g., 350-351) desires to receive shipments. In some embodiments, the zip code can be determined by prompting the user (e.g., 350-351) to input their zip code in the website provided by web server 305. In the same or other embodiments, the zip code can be determined based on recognizing the user (e.g., 350-351), and there is a zip code stored based on a previous entry by the user (e.g., 350-351). For example, if the user (e.g., 350-351) logs into the website, or is otherwise recognized, such as through tracked cookies, etc., the zip code used for the location of the user (e.g., 350-351) can be a zip code stored in the profile of the user (e.g., 350-351) and/or a zip code to which the user (e.g., 350-351) previously had an item shipped. In the same or other embodiments, the zip code can be determined based on geo-sniffing the current session of the user (e.g., 350-351). For example, the geo-sniffing can be based on global positioning system (GPS) data retrieved from the user computer (e.g., 340-341), IP (Internal Protocol) address location data for the user computer (e.g., 340-341), and/or other suitable geolocation methods.

In several embodiments, item classification system 312 can classify each unique item into one of four geo-classifications. These geo-classifications can be an "always two-day" classification, a "never two-day" classification, a "local geo" classification, and/or a "network geo" classification. The classification of items into one of these four geo-classifications can be based on rules. For example, the rules can be tailored to balance conversion of the items (e.g., item sales) with profitability. The rules can be implemented in a rules engine.

In a number of embodiments, items classified in the "always two-day" classification can be items in which the high value of the item trumps the shipping cost of the item. For example, criteria for classifying an item in the "always two-day" classification can include that a price of the item exceeds a predetermined threshold (e.g., $20, $23, $25, $28, $30, $35, or another suitable value), that a sale margin for the item exceeds a predetermined threshold (e.g., enough to cover an upgrade to air shipment if ground shipment is not available within two days), that the item is sortable, that the item is regular-sized or smaller (e.g., the item is sortable, and/or a size of the item is less than a predetermined threshold), that the item is air shippable, that the item is categorized in a high-value department (e.g., apparel, media, books), and/or other suitable criteria. For example, a laptop computer can be categorized in the "always two-day" classification.

In several embodiments, items classified in the "never two-day" classification can be items which can never be delivered in two days. For example, criteria for classifying an item the "never two-day" classification can include that a size of the item exceeds than a predetermined threshold (e.g., non-sortable, and/or the item is bulky), that the item is not air shippable, that the item is sold through stores but not online, that the item is categorized in a certain department (e.g., photo, e-delivery, freight), and/or other suitable criteria. For example, a kayak or piece of furniture can be categorized in the "never two-day" classification.

In a number of embodiments, items classified in the "local geo" classification can be items which can be offered for two-day shipping under certain conditions, based on the low value of the items. For example, criteria for classifying an item the "local geo" classification can include that a price of the item is below a predetermined threshold (e.g., $20, $23, $25, $28, $30, $35, or another suitable value), that a sale margin for the item is below a predetermined threshold, that the item is regular sized or smaller (e.g., the item is sortable, and/or a size of the item is less than a predetermined threshold), that the item is categorized in a certain department (e.g., everyday living), and/or other suitable criteria. For example, everyday consumable items such as trash bags, batteries, baby wipes, etc., can be categorized in the "local geo" classification.

In several embodiments, items classified in the "network geo" classification can be items which can be offered for two-day shipping under certain conditions. For example, criteria for classifying an item the "network geo" classification can include that the item is not classified under one of the other geo-classifications (e.g., the "always two-day" classification, the "never two-day" classification, and the "local geo" classification). For example, most items available on the website can be categorized in the "network geo" classification, unless the item falls into one of the other categories.

In many embodiments, inventory system 313 can track which items are available at each of the distribution centers (e.g., 361-364) in fulfillment network 360. In some embodiments, inventory system 313 can receive information from each of the distribution centers (e.g., 361-364) in fulfillment network 360 to aggregate information, for each item, about which the distribution centers (e.g., 361-364) in fulfillment network 360 have the item currently available. In several embodiments, inventory system 313 can be queried with an item (e.g., a SKU) as input, and inventory system 313 can return a list of the distribution centers (e.g., 361-364) in fulfillment network 360 that currently have the item available.

Figure 5:
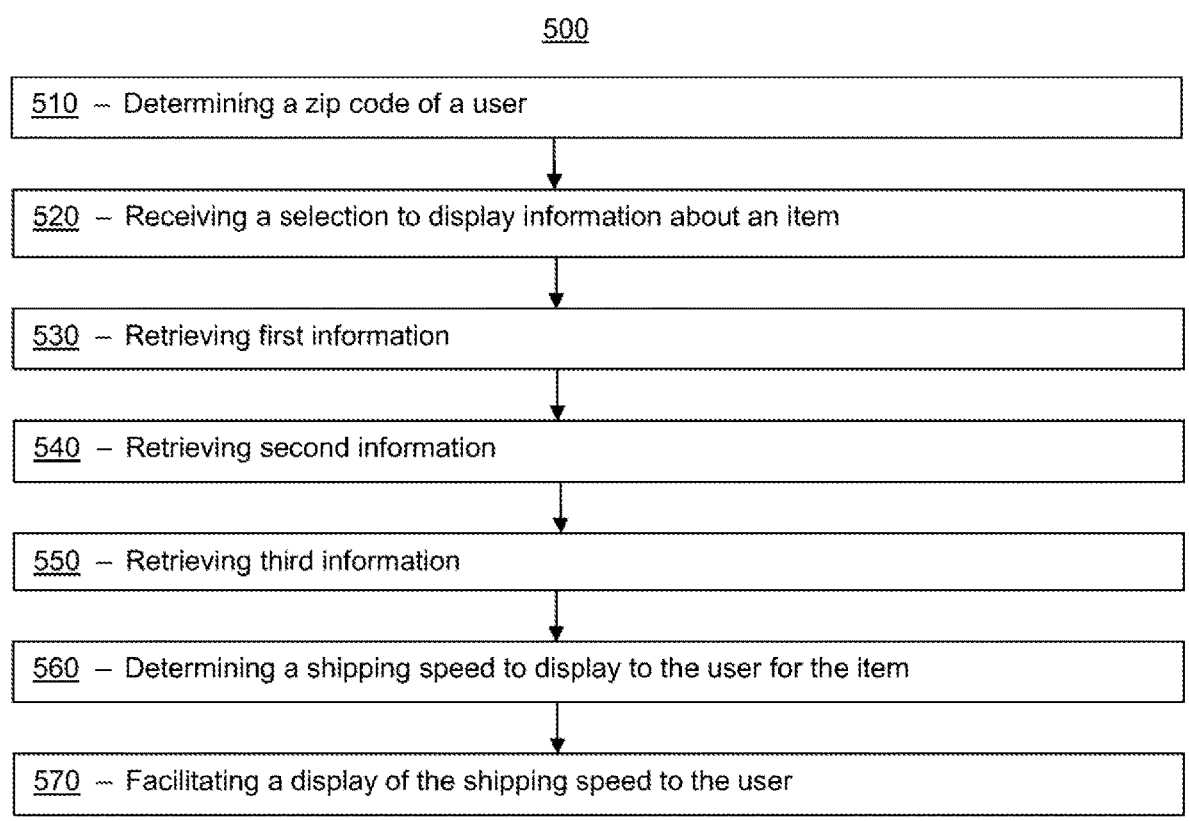
FIG. 5 illustrates a flow chart for a method, according to another embodiment.
Figure 6:
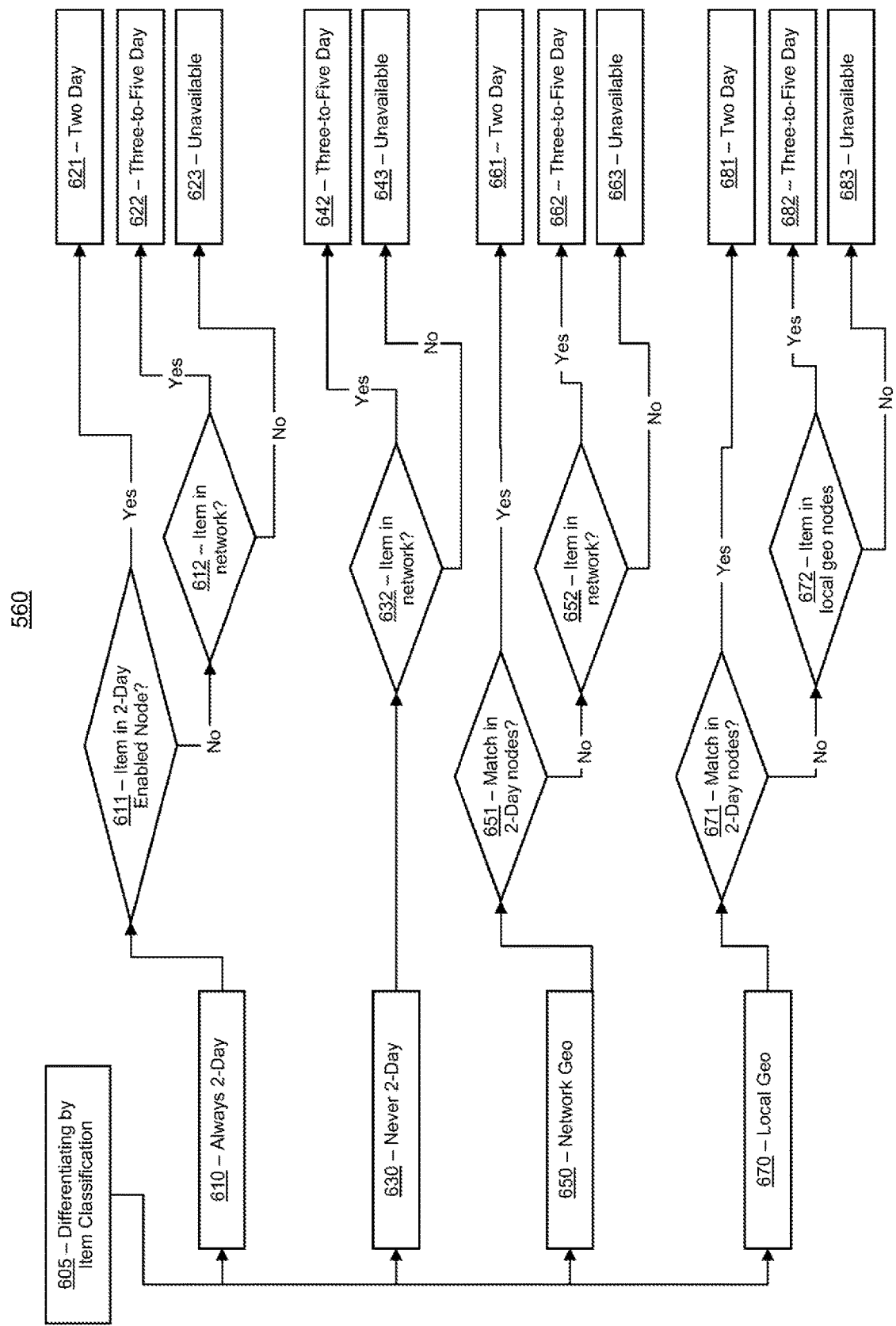
FIG. 6 illustrates a flow chart for a block of determining a shipping speed to display to the user for the item, according to the embodiment of FIG. 5.

In a number of embodiments, speed availability system 314 can determine a shipping speed to be displayed to a user (e.g., 350-351) for an item. In many embodiments, the shipping speed can be the fastest shipping speed to be offered for free (e.g., no additional shipping charge) to the user (e.g., 350-351), although in some cases, an option to pay for faster shipping (e.g., pay for air shipment) can be available to the user (e.g., 350-351) for the item. In several embodiments, speed availability system 314 can tailor the shipping speed displayed for each item and for each user (e.g., 350-351), based on the location (e.g., zip code) of the user (e.g., 350-351), as shown in FIGS. 5-6 and described below in further detail. In many embodiments, the shipping speed can be displayed when the user (e.g., 350-351) views information about the item. For example, if a user (e.g., 350-351) opens an item page to view information about an item, the item page can include an indication of what shipping speed is available to the user (e.g., 350-351). If speed availability system 314 determines that the item can be displayed with a two-day shipping speed for the user (e.g., 350-351), the item page can show that two-day shipping is available for that item to the user (e.g., 350-351). In many embodiments, the shipping speeds that can be displayed can be two-day, three to five-day, and/or unavailable (meaning the item is not available to be shipped to the user at any shipping speed).

In many embodiments, communication system 315 can facilitate communications between geo system 310 can other systems, such as web server 305, fulfillment network 360, and/or zip service system 320. Communication system 315 can perform additional functions, as described below in further detail.

In a number of embodiments, zip service system 320 can track and/or generate current information about the availability of the distribution centers (e.g., 361-364) in fulfillment network 360 to ship to the various locations (e.g., zip codes) within the various shipping speed options. In several embodiments, zip service system 320 can generate a mapping from each zip code to a list of the distribution centers (e.g., 361-364) in fulfillment network 360 that can deliver to the zip code within a specified shipping speed (e.g., two-day shipping). In many embodiments, ground shipment can be used as a criterion when determining if the distribution centers (e.g., 361-364) in fulfillment network 360 can deliver to the zip code within the specified shipping speed. In a number of embodiments, zip service system 320 can provide an eligibility service that can be queried with a zip code and a shipping time period (e.g., shipping speed) as input, and zip service system 320 can return a list of the distribution centers (e.g., 361-364) in fulfillment network 360 that can deliver to the zip code via ground shipping within the shipping time period specified in the input query. For example, if zip service system 320 is queried with a zip code 94041 with an input shipping time period of two days, zip service system 320 can return a list of the distribution centers (e.g., 361-364) in fulfillment network 360 that can deliver any standard order within two days to the 94041 zip code using ground shipment. In many embodiments, the information provided by zip service system 320 can be irrespective of the items to be shipped, provided that the items are standard sized, such as any item that is not a bulky item that would receive a geo-classification in the "never two-day" classification. In several embodiments, the information provided by zip service system 320 can be determined in real-time based on current capacities and/or calendars of the distribution centers (e.g., 361-364) in fulfillment network 360 and/or the carriers that are available to be used for the shipment, as shown in FIG. 4 and described below in further detail.

In many embodiments, zip service system 320 can include various systems and/or components. Zip service system 320 is merely exemplary and is not limited to the embodiments presented herein. Zip service system 320 can be employed in many different embodiments or examples not specifically depicted or described herein. In some embodiments, certain elements or system of zip service system 320 can perform various procedures, processes, and/or acts. In other embodiments, the procedures, processes, and/or acts can be performed by other suitable elements or systems. In many embodiments, the systems of zip service system 320 can be modules of computing instructions (e.g., software modules) stored at non-transitory computer readable media that operate on one or more processors. In other embodiments, the systems of zip service system 320 can be implemented in hardware.

In many embodiments, zip service system 320 can include a preprocessing system 321, a master system 322, a worker system 323, an aggregator system 324, a communication system 325, and/or database 326. In several embodiments, preprocessing system 321 can generate preliminary eligibility information, as describe below in further detail. In a number of embodiments, master system 322 can initiate and/or trigger processing to be performed by other systems in zip service system 320, such as by worker system 323 and/or aggregator system 324. In several embodiments, worker system 323 can be a multi-threaded system that outputs a list of zip codes on which a requested distribution center (e.g., 361-364) can source within a requested speed, based on eligibility, capacities, and/or calendars of the distribution center (e.g., 361-364) and/or the various available carrier methods. In a number of embodiments, aggregator system 324 can aggregate information from each thread of worker system 323, and transform the information to provide a mapping that can be used by communication system 325 to provide the eligibility service of zip service system 320, as described above. The systems of zip service system 320 can perform additional functions, as described below in further detail.

Figure 4:
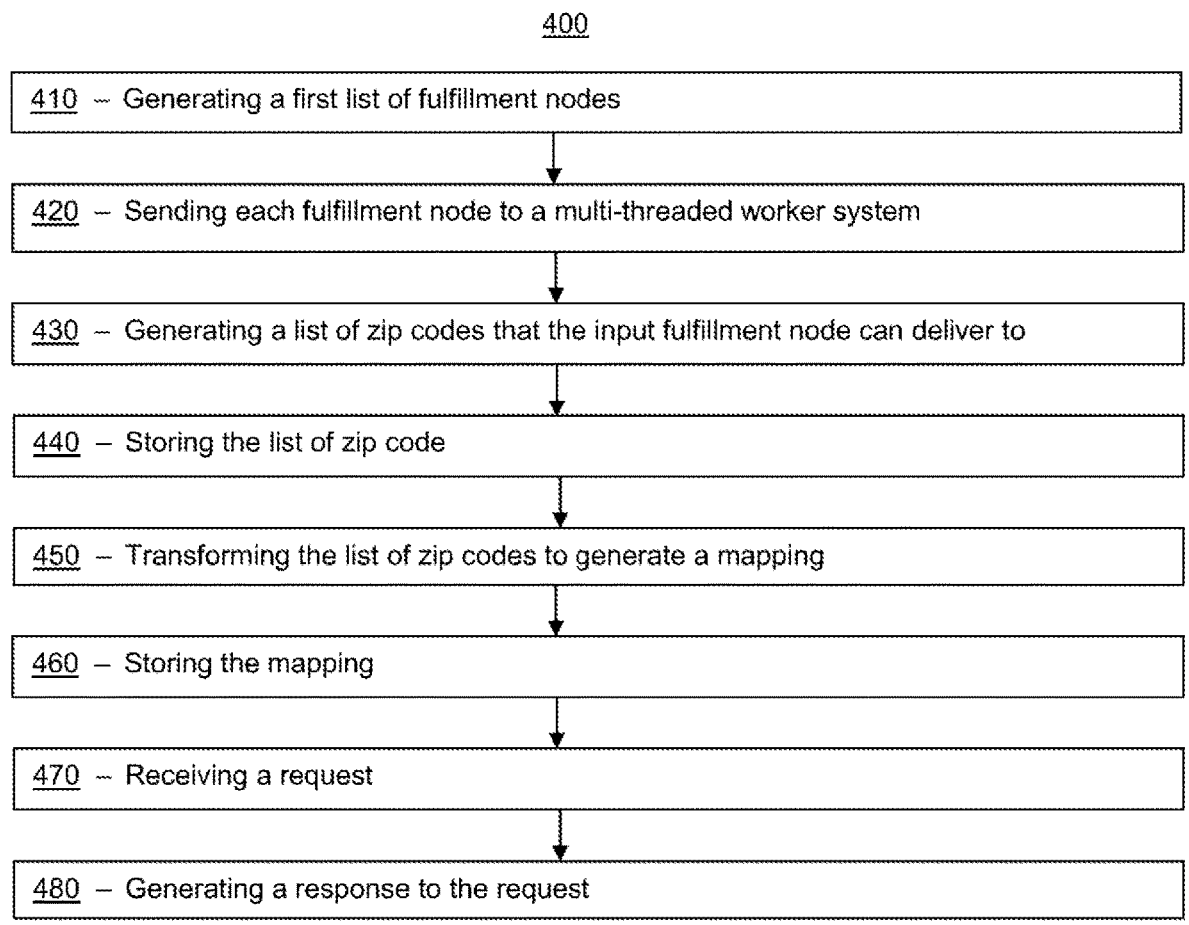
FIG. 4 illustrates a flow chart for a method, according to another embodiment.

Turning ahead in the drawings, FIG. 4 illustrates a flow chart for a method 400. In some embodiments, method 400 can be a method of providing an automatic determination of fulfillment nodes eligible for a specified shipping speed. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, zip service system 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as zip service system 320 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of generating, at a master system, a first list of fulfillment nodes of fulfillment nodes in a fulfillment network, such that each fulfillment node in the first list of fulfillment nodes is enabled to deliver within a first shipping time period. The master system can be similar or identical to master system 322 (FIG. 3). The fulfillment network can be similar or identical to fulfillment network 360 (FIG. 3). The fulfillment nodes can be similar or identical to distribution centers 361-364 (FIG. 3). In many embodiments, the first shipping time period can be two days. In other embodiments, the first shipping time period can be another one day, three days, or three-to-five days. In several embodiments, the master can be a single-threaded process. In some embodiments, the master can generate a list of two-day enabled fulfillment nodes. The fulfillment nodes that are two-day enabled can be those fulfillment nodes that it is possible to deliver from in two-days. In many embodiments, the master system can generate the first list of the fulfillment nodes on a predetermined schedule, such as at least every fifteen minutes, or every ten minutes.

In several embodiments, method 400 also can include a block 420 of sending each fulfillment node in the first list of fulfillment nodes from the master system to a separate instance of a multi-threaded worker system as an input fulfillment node. The multi-threaded worker system can be similar or identical to worker system 323 (FIG. 3). In several embodiments, each separate instance of the multi-threaded worker system can be a separate thread of the multi-threaded worker system, and each of these separate instances can receive as input a separate fulfillment node from the list of fulfillment nodes generated in block 410. In some embodiments, once the master system generates the list of fulfillment nodes, the master system can send each of the fulfillment nodes in the list of fulfillment nodes to a separate instance of the multi-threaded worker system to run in parallel. As the number of fulfillment nodes can be large, in several embodiments, the master system can send the fulfillment nodes to separate instances of the multi-threaded worked system in a controlled fashion rather than all at once.

In a number of embodiments, method 400 additionally can include a block 430 of generating, at each separate instance of the multi-threaded worker system, a list of zip codes that the input fulfillment node can deliver to via ground shipping within the first shipping time period, based at least in part on preliminary eligibility information and an evaluation of current factors. In many embodiments, the preliminary eligibility information can include a preliminary mapping from (a) each combination of (i) each individual fulfillment node of the fulfillment nodes, (ii) each individual carrier method of carrier methods, and (iii) each individual transit time of a set of transit times to (b) a preliminary list of zip codes that can be delivered to via ground shipping from the individual fulfillment node using the individual carrier method within the individual transit time. In some embodiments, the preliminary eligibility information can be generated by retrieving transit time information from the carrier methods available to be used at the fulfillment nodes. In several embodiments, the preliminary eligibility information can be generated at least twice per day. In some embodiments, the preliminary information can be based on static data, such that it does not consider the current conditions of the fulfillment nodes and/or the carrier methods.

In some embodiments, the preliminary eligibility information can be generated at least in part by using a transportation map to consolidate a list of fulfillment nodes that are available to deliver by ground shipping within the first shipping time to each of one or more zip codes. For example, for a particular zip code, there can be five different fulfillment nodes that can achieve two-day ground shipment to the zip code, but by showing two of these five fulfillment nodes as eligible for two-day shipment, consolidation to the zip code can be achieved, which can advantageously limit splits in shipments between multiple fulfillment nodes. In many embodiments, the transportation map can be generated based on business considerations to attain this consolidation. In many embodiments, the transportation map can be joined with the preliminary mapping to update the preliminary mapping by consolidating the fulfillment nodes eligible for two-day shipping in many cases. In a number of embodiments, the preliminary eligibility information can be stored in a database, such as database 326 (FIG. 3).

In many embodiments, the each separate instance of the multi-threaded worker system can take the preliminary eligibility information that applies to the input fulfillment node, and use the current factors, based on real-time information, to consider if the fulfillment node and the carrier methods have the capacity to handle additional orders, as fulfillment nodes can be limited in the number of orders that can be handled, and carrier methods can be limited in the number of items that can be shipped. In several embodiments, the current factors can include: (a) pickup calendars for carrier methods at the input fulfillment node, (b) delivery calendars for the carrier methods, (c) capacities of the carrier methods to handle additional orders, (d) a capacity of the input fulfillment node to handle additional orders; and/or (e) a processing time for the input fulfillment node. The carrier methods can be the different methods that can be used to make a shipment, such as the different methods offered by the shipping companies that are used at the fulfillment node. The capacity and/or calendars of the carrier methods can be used to determine whether the carrier can be used for a particular transit time. For example, a first carrier method and a second carrier method can be used for two-day ground shipping from the input fulfillment node to a particular zip code, such as 94066. The first carrier method can have a 5 pm cutoff shipment time, and the second carrier method can have a 12 noon cutoff shipment time. If it is already 1 pm at the input fulfillment node, the second carrier method can be past the cutoff shipment time, such that it cannot be used under the current situations for two-day shipping, but the first carrier method is still available, provided that the fulfillment center has capacity and the processing time of the fulfillment center would allow for the shipment to be processed for shipment before the 5 pm cutoff time.

In several embodiments, the list of zip codes can be generated for the input fulfillment node based on these current factors using dynamic data, and, collectively, the various separate instances of the multi-threaded worker system can generate lists of zip codes for the various fulfillment nodes. In many embodiments, the list of zip codes generated by each separate instance of the multi-threaded worker system can represent those zip codes that the input fulfillment nodes can deliver to via ground shipping within the first shipping time period, such as two-day ground shipping, based on current conditions at the fulfillment nodes and/or carrier methods. In a number of embodiments, the lists of zip codes can be generated by the separate instances of the multi-threaded worker system at least every 15 minutes, and some embodiments can be run at least every 10 minutes. In some embodiments, the multi-threaded worker system can take around two minutes to generate the list of zip codes for the input fulfillment node.

In several embodiments, method 400 further can include a block 440 of storing the lists of zip codes generated by the separate instances of the multi-threaded worker system in a database. The database can be similar or identical to database 326 (FIG. 3).

In a number of embodiments, method 400 additionally can include a block 450 of transforming, with an aggregator system, the lists of zip codes stored in the database to generate a mapping from each zip code in the lists of zip codes to a list of fulfillment nodes of the fulfillment nodes that can deliver via ground shipping to the each zip code within the first shipping speed. The aggregator system can be similar or identical to aggregator system 324 (FIG. 3). In many embodiments, the aggregator system can be a single-threaded process that pulls the information from the database (e.g., 326 (FIG. 3)) that was generated by each of the separate instances (e.g., separate threads) of the multi-threaded worker system to create a reverse mapping. Each of the threads of the multi-threaded worker system can generate a mapping from a fulfillment node to a list of zip codes for the first shipping time period. The aggregator system can transform these mappings to be a mapping from each zip code to a list of fulfillment nodes that are available currently for shipping to that zip code at the first shipping time period.

As a simplified example, with a first shipping time period of two days, master system can generate a list of fulfillment nodes that are two-day eligible, such as FN1, FN2, FN3, and FN 4. A first instance of the multi-threaded worker system can receive an input fulfillment node of FN1, and can generate a list of zip codes, such as Zip1, Zip2, Zip3, and Zip4. A second instance of the multi-threaded worker system can receive an input fulfillment node of FN2, and can generate a list of zip codes, such as Zip1, Zip3, and Zip5. A third instance of the multi-threaded worker system can receive an input fulfillment node of FN3, and can generate a list of zip codes, such as Zip2, and Zip4. A fourth instance of the multi-threaded worker system can receive an input fulfillment node of FN4, and can generate a list of zip codes, such as Zip3, and Zip 5. The aggregator system can take these inputs and generate mappings from each zip code to the fulfillment nodes, such as a mapping from Zip1 to FN1 and FN2; from Zip2 to FN1 and FN3; from Zip3 to FN1, FN2, and FN4; from Zip4 to FN1 and FN3; and from Zip5 to FN2 and FN4.

In a number of embodiments, the lists of zip codes stored in the database can be transformed by the aggregator system to generate the mapping at least every 15 minutes, and in some embodiments can be transformed at least every 10 minutes. In some embodiments, the multi-threaded worker system can take less than a minute to transform the list of zip code to generate the mapping.

In several embodiments, method 400 further can include a block 460 of storing the mapping in the database.

In a number of embodiments, method 400 additionally can include a block 470 of receiving a request including an input zip code and an input shipping time period. For example, the request can be received at communication system 325 (FIG. 3), such as by speed availability system 314, to determine which fulfillment nodes were mapped to the input zip code for the input shipping time period.

In several embodiments, method 400 further can include a block 480 of generating a response to the request. In many embodiments, the response can include a second list of fulfillment nodes based on the mapping stored in the database such that each fulfillment node in the list of fulfillment nodes can deliver to the input zip code via ground shipping within the input shipping time period. For example, communication system 325 can provide an eligibility service that queries the mapping stored in the database in block 460 to determine the list of fulfillment nodes that are mapped to the input zip code. In many embodiments, the response to can sent to the system that sent the request. In a number of embodiments, because the dynamic information has been stored recently (e.g., in the last ten minutes or last fifteen minutes in the database (e.g., 326)), the response times provided in block 480 after receiving the request in block 470 can be very low latency. For example, in testing, 95% of responses were provided within 4 milliseconds of receiving the request, and 99% of responses were provided within 13 milliseconds of receiving the request.

Turning ahead in the drawings, FIG. 5 illustrates a flow chart for a method 500. In some embodiments, method 500 can be a method of providing an automatic determination of a shipping speed to display for an item. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) and/or geo system 320 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) and/or geo system 320 (FIG. 3). The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include a block 510 of determining a zip code of a user using a website that displays items for sale. In many embodiments, the website can be hosted by web server 305 (FIG. 3). The user can be similar or identical to users 350-351 (FIG. 3). In several embodiments, determining the zip code of the user can include at least one of: (a) receiving the zip code from an input of the user in a current session of the user using the website, retrieving a last transaction of the user to obtain the zip code, or detecting the zip code through geo-sniffing the current session of the user using the website.

In several embodiments, method 500 also can include a block 520 of receiving a selection by the user to display information about an item of the items for sale. For example, the user can navigate to an item page on the website to display information about the item.

In a number of embodiments, method 500 additionally can include a block 530 of retrieving first information including a predetermined geo-classification for the item. In many embodiments, the geo-classification can be similar to the geo-classification described above. In some embodiments, the geo-classification for the item can be set to an always two-day classification at least when a sale margin for the item exceeds a first predetermined margin threshold. For example, the first predetermined margin threshold can be set to an amount that allows for a profit margin even if the item would be delivered by air shipment. In a number of embodiments, the geo-classification for the item can be set to a never two-day classification at least when a size of the item exceeds a predetermined size threshold. For example, when the size of the item results in a bulky classification by carrier methods, the item can be classified in the never two-day classification. In various embodiments, the geo-classification for the item can be set to a local geo classification at least when the sale margin of the item is less than a second predetermined margin threshold. For example, the second predetermined margin threshold can be set such that the margins for the items classified in the local geo classification are in the bottom 5, 10, 15, 20, or 25 percent of margins. In several embodiments, the geo-classification for the item otherwise can set to a network geo classification. In many embodiments, the first information can be retrieved from item classification system 312 (FIG. 3)

In several embodiments, method 500 further can include a block 540 of retrieving second information including a list of fulfillment nodes that can currently deliver to the zip code of the user within a first shipping speed via ground shipping. In many embodiments, the first shipping speed is two days. In many embodiments, the second information can be retrieved by calling zip service system 320 (FIG. 3), which can determine the second information as shown in method 400 (FIG. 4) and described above.

In a number of embodiments, method 500 additionally can include a block 550 of retrieving third information including a node-level inventory for the item. In several embodiments, the node-level inventory for the item can include a second list of fulfillment nodes that currently have the item available. For example, the third information for a particular SKU can indicate that the SKU is available at certain fulfillment nodes, such as FN1 and FN3. In many embodiments, the third information can be retrieved from inventory system 313 (FIG. 3).

In several embodiments, method 500 further can include a block 560 of determining a shipping speed to display to the user for the item based on (a) the predetermined geo-classification for the item, (b) the list of fulfillment nodes that can currently deliver to the zip code of the user within the first shipping speed, and (c) the node-level inventory for the item. In many embodiments, block 560 can be implemented as shown in FIG. 6 and described below.

In a number of embodiments, method 500 additionally can include a block 570 of facilitating a display of the shipping speed to the user. In several embodiments, the shipping speed can be displayed to the user in an item page for the item.

Turning ahead in the drawings, FIG. 6 illustrates a flow chart for block 560 of determining a shipping speed to display to the user for the item based on (a) the predetermined geo-classification for the item, (b) the list of fulfillment nodes that can currently deliver to the zip code of the user within the first shipping speed, and (c) the node-level inventory for the item. Block 560 is merely exemplary and is not limited to the embodiments presented herein. Block 560 can be employed in many different embodiments or examples not specifically depicted or described herein. In some embodiments, the procedures, the processes, and/or the activities of block 560 can be performed in the order presented. In other embodiments, the procedures, the processes, and/or the activities of block 560 can be performed in any suitable order. In still other embodiments, one or more of the procedures, the processes, and/or the activities of block 560 can be combined or skipped.

Referring to FIG. 5, block 560 can include a block 605 of differentiating by the predetermined geo-classification of the item in the first information. When the predetermined geo-classification of the item is the always two-day classification, the flow chart can proceed to a block 610. Otherwise, when the predetermined geo-classification of the item is the never two-day classification, the flow chart can proceed to a block 630. Otherwise, when the predetermined geo-classification of the item is the network geo classification, the flow chart can proceed to a block 650. Otherwise, when the predetermined geo-classification of the item is the local geo classification, the flow chart can proceed to a block 670.

In a number of embodiments, at block 610, when the geo-classification of the item is the always two-day classification, the flow chart can proceed to a decision block 611 of determining if the item is in at least one fulfillment node that is in a two-day enabled fulfillment node. If the output of decision block 611 is yes, the flow chart can proceed to a block 621 of setting the shipping speed to two-day shipping. Otherwise, if the output of decision block 611 is no, the flow chart can proceed to a decision block 612 of determining whether the item is in the fulfillment network. For example, decision block 612 can determine if the item is available in any of the fulfillment nodes in the fulfillment network. If the output of decision block 612 is yes, the flow chart can proceed to a block 622 of setting the shipping speed to three to five-day shipping. Otherwise, if the output of decision block 612 is no, the flow chart can proceed to a block 623 of setting an availability of the item to unavailable. In many embodiments, when the availability of the item is set to unavailable, the item can be unavailable for ordering at the current time. In many embodiments, the determinations in decision block 611 and/or decision block 612 can be independent of the content in the second information.

In several embodiments, at block 630, when the geo-classification of the item is the never two-day classification, the flow chart can proceed to a decision block 632 of determining whether the item is in the fulfillment network. For example, decision block 632 can determine if the item is available in any of the fulfillment nodes in the fulfillment network. If the output of decision block 632 is yes, the flow chart can proceed to a block 642 of setting the shipping speed to three to five-day shipping. Otherwise, if the output of decision block 632 is no, the flow chart can proceed to a block 643 of setting an availability of the item to unavailable. In many embodiments, the determination in decision block 632 can be independent of the content in the second information.

In a number of embodiments, at block 650, when the geo-classification of the item is the network geo classification, the flow chart can proceed to a decision block 651 of determining if the list of fulfillment nodes in the first information for two-days at the first shipping speed includes a match for at least one or more fulfillment nodes in the node level inventory for the item in the third information. In other words, if there is a fulfillment node that is capable of ground shipping to the zip code of the user in two days based on the current conditions, as provided in the second information, and that fulfillment node includes the item, as provided in the third information, then there is a match. If the output of decision block 651 is yes, the flow chart can proceed to a block 661 of setting the shipping speed to two-day shipping. Otherwise, if the output of decision block 651 is no, the flow chart can proceed to a decision block 652 of determining whether the item is in the fulfillment network. For example, decision block 652 can determine if the item is available in any of the fulfillment nodes in the fulfillment network. If the output of decision block 652 is yes, the flow chart can proceed to a block 662 of setting the shipping speed to three to five-day shipping. Otherwise, if the output of decision block 652 is no, the flow chart can proceed to a block 663 of setting an availability of the item to unavailable.

In several embodiments, at block 670, when the geo-classification of the item is the local geo classification, the flow chart can proceed to a decision block 671 of determining if the list of fulfillment nodes in the first information for two-days at the first shipping speed includes a match for at least one or more fulfillment nodes in the node level inventory for the item in the third information. In other words, if there is a fulfillment node that is capable of ground shipping to the zip code of the user in two days based on the current conditions, as provided in the second information, and that fulfillment node includes the item, as provided in the third information, then there is a match. If the output of decision block 671 is yes, the flow chart can proceed to a block 681 of setting the shipping speed to two-day shipping. Otherwise, if the output of decision block 671 is no, the flow chart can proceed to a decision block 652 of determining whether the item is in a local geo discoverable fulfillment node.

In some embodiments, certain fulfillment nodes can be designated as a local geo discoverable fulfillment node, which can allow local geo items to be shipped using ground shipping from the fulfillment node in three-to-five days. For example, if a fulfillment node FN1 has a capacity issue, it can be removed from the second information as a two-day capable fulfillment node under the current conditions, based on the capacity issue. If fulfillment node FN1 houses certain local geo items that are not available at other fulfillment nodes in the fulfillment network, these items would be listed as unavailable if fulfillment node FN1 were not designated as a local geo discoverable fulfillment node. Fulfillment node thus can be designated as a local geo discoverable fulfillment node in order to allow the local geo items available solely at fulfillment node FN1 to be made available with a shipping speed of three to five-day shipping instead of being unavailable. In several embodiments, the second information can include an indication of the fulfillment node is designated as a local geo discoverable fulfillment node. If the output of decision block 672 is yes, the flow chart can proceed to a block 682 of setting the shipping speed to three to five-day shipping. Otherwise, if the output of decision block 672 is no, the flow chart can proceed to a block 683 of setting an availability of the item to unavailable.

In various embodiments, each of the fulfillment nodes can be designated as to whether the fulfillment node can handle network geo items and/or local geo items. In many embodiments, this information can be provided in the second information for each of the fulfillment nodes in the list of fulfillment nodes. In many embodiments, the determinations in decision block 651 and/or decision block 671 further can involve determining if a matching fulfillment node also matches the predetermined geo-classification of the item in the first information, and finding matches when this additional condition is satisfied.

As an example, for an item A, with a zip code of 94404 for the user, the first information can include that the predetermined geo-classification of the item is network geo.

The second information can include a list of fulfillment nodes that are currently capable of shipping in two days to zip code 94404, such as FN1, FN2, and FN3, and each of these fulfillment nodes can be designated as a network geo-capable fulfillment node. The third information can indicate that item A is available at fulfillment node FN3. In this case, there is a match at FN3 between the second information and the third information, so the shipping speed can be set to two-day shipping, such that two-day shipping can be shown for item A to the user. If instead the third information indicate that item A is available at fulfillment node FN4, the shipping speed would not be set to two-day shipping, but would instead be set to three to five-day shipping. The shipping speed can be different for a different user in a different zip code. The shipping speed can be different for a different item to be shipping to the user. The shipping speed is thus be dynamically curated for the item and zip code of the user, based on current, real-time conditions.

Returning to FIG. 3, in several embodiments, web server 305 can at least partially perform block 520 (FIG. 5) of receiving a selection by the user to display information about an item of the items for sale and/or block 570 (FIG. 5) of facilitating a display of the shipping speed to the user.

In a number of embodiments, user location system 311 can at least partially perform block 510 (FIG. 5) of determining a zip code of a user using a website that displays items for sale.

In several embodiments, item classification system 312 can at least partially perform block 530 (FIG. 5) of retrieving first information including a predetermined geo-classification for the item.

In a number of embodiments, inventory system 313 can at least partially perform block 550 (FIG. 5) of retrieving third information including a node-level inventory for the item.

In several embodiments, speed availability system 314 can at least partially perform block 560 (FIG. 5) of determining a shipping speed to display to the user for the item based on (a) the predetermined geo-classification for the item, (b) the list of fulfillment nodes that can currently deliver to the zip code of the user within the first shipping speed, and (c) the node-level inventory for the item.

In a number of embodiments, inventory system 315 can at least partially perform block 520 (FIG. 5) of receiving a selection by the user to display information about an item of the items for sale, block 530 (FIG. 5) of retrieving first information including a predetermined geo-classification for the item, block 540 (FIG. 5) of retrieving second information including a list of fulfillment nodes that can currently deliver to the zip code of the user within a first shipping speed via ground shipping, block 550 (FIG. 5) of retrieving third information including a node-level inventory for the item, and/or block 570 (FIG. 5) of facilitating a display of the shipping speed to the user.

In several embodiments, preprocessing system 321 can at least partially perform generating the preliminary eligibility information.

In a number of embodiments, master system 322 can at least partially perform block 410 (FIG. 4) of generating, at a master system, a first list of fulfillment nodes of fulfillment nodes in a fulfillment network, such that each fulfillment node in the first list of fulfillment nodes is enabled to deliver within a first shipping time period and/or block 420 (FIG. 4) of sending each fulfillment node in the first list of fulfillment nodes from the master system to a separate instance of a multi-threaded worker system as an input fulfillment node.

In several embodiments, worker system 323 can at least partially perform block 420 (FIG. 4) of sending each fulfillment node in the first list of fulfillment nodes from the master system to a separate instance of a multi-threaded worker system as an input fulfillment node, block 430 (FIG. 4) of generating, at each separate instance of the multi-threaded worker system, a list of zip codes that the input fulfillment node can deliver to via ground shipping within the first shipping time period, based at least in part on preliminary eligibility information and an evaluation of current factors, and/or block 440 (FIG. 4) of storing the lists of zip codes generated by the separate instances of the multi-threaded worker system in a database.

In a number of embodiments, aggregator system 324 can at least partially perform block 450 (FIG. 4) of transforming, with an aggregator system, the lists of zip codes stored in the database to generate a mapping from each zip code in the lists of zip codes to a list of fulfillment nodes of the fulfillment nodes that can deliver via ground shipping to the each zip code within the first shipping speed and/or block 460 (FIG. 4) of storing the mapping in the database.

In several embodiments, communication system 325 can at least partially perform block 470 (FIG. 4) of receiving a request including an input zip code and an input shipping time period, block 480 (FIG. 4) of generating a response to the request, and/or block 540 (FIG. 5) of retrieving second information including a list of fulfillment nodes that can currently deliver to the zip code of the user within a first shipping speed via ground shipping.

In many embodiments, the techniques described herein can provide several technological improvements. In some embodiments, the techniques described herein can provide for automatic determination of fulfillment nodes eligible for a specified shipping speed. In a number of embodiments, the techniques described herein can provide for automatic determination of a shipping speed to display for an item. In many embodiments, the techniques described herein can beneficially make determinations based on real-time information that describes current conditions. In a number of embodiments, the techniques described herein can advantageously enable efficient utilization of a fulfillment network (e.g., 360 (FIG. 3)) by dynamically curating assortment and/or shipping speed based on the location of the user (e.g., 350-351 (FIG. 3)), which can beneficially result in a reduction in shipping costs.

In many embodiments, the techniques described herein can beneficially control the shipping speed offered to the user (e.g., 350-351 (FIG. 3)) based on inventory available at the distribution centers (e.g., 361-364 (FIG. 3)) of the fulfillment network (e.g., 360 (FIG. 3)) to reduce shipping costs. For example, dynamic two-day eligibility can be determined based on the zip code of the user (e.g., 350-351 (FIG. 3)). In many embodiments, the techniques described herein can reduce shipping upgrades (e.g., to air shipment) being used to meet the SLA promised to the user (e.g., 350-351 (FIG. 3)). In several embodiments, the techniques described herein can reduce splits by consolidating the fulfillment nodes (e.g., distribution centers 361-364 (FIG. 3)) in the transportation map.

In a number of embodiments, the techniques described herein can advantageously provide a consistent user experience by determining shipping speed dynamically for each item using a centralized geo system (e.g., 310 (FIG. 3)) across different applications that query this information, such as item pages, search pages, etc. In various embodiments, the techniques described herein can dynamically determine whether to offer free two-day shipping while the page loads within very low latency response times. In many embodiments, the techniques described herein can perform the dynamic determinations based on current information, such as the capacity of the fulfillment nodes, the capacity of the carriers, the carrier pickup and delivery calendars, and other suitable information. In some embodiments, the techniques provided herein can beneficially reduce shipping costs while continuing to offer a very large number of items to most users with free two-day shipping. For example, over two million items can be offered with two-day shipping, although not necessarily for 100% of the users.

In many embodiments, the techniques described herein can be used continuously at a scale that cannot be handled using manual techniques. For example, the number of monthly visits to the website can exceed one hundred million, the number of registered users to the website can exceed ten million, and/or the number of items sold on the website can exceed ten million.

In a number of embodiments, the techniques described herein can solve a technical problem that arises only within the realm of computer networks, as determining whether to offer two-day shipping on a website that makes available items does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the online website that is part of the techniques described herein would not exist.

Various embodiments can include a system including one or more processors and one or more non-transitory computer-readable media storing computing instructions configured to run on the one more processors and perform certain acts. The acts can include generating, at a master system, a first list of fulfillment nodes of fulfillment nodes in a fulfillment network, such that each fulfillment node in the first list of fulfillment nodes is enabled to deliver within a first shipping time period. The acts also can include sending each fulfillment node in the first list of fulfillment nodes from the master system to a separate instance of a multi-threaded worker system as an input fulfillment node. The acts additionally can include generating, at each separate instance of the multi-threaded worker system, a list of zip codes that the input fulfillment node can deliver to via ground shipping within the first shipping time period, based at least in part on preliminary eligibility information and an evaluation of current factors. The acts further can include storing the lists of zip codes generated by the separate instances of the multi-threaded worker system in a database. The acts additionally can include transforming, with an aggregator system, the lists of zip codes stored in the database to generate a mapping from each zip code in the lists of zip codes to a list of fulfillment nodes of the fulfillment nodes that can deliver via ground shipping to the each zip code within the first shipping speed. The acts further can include storing the mapping in the database. The acts additionally can include receiving a request including an input zip code and an input shipping time period. The acts further can include generating a response to the request. The response can include a second list of fulfillment nodes based on the mapping stored in the database, such that each fulfillment node in the second list of fulfillment nodes can deliver to the input zip code via ground shipping within the input shipping time period.

A number of embodiments can include a method being implemented via execution of computing instructions configured to run at one or more processors and stored at one or more non-transitory computer-readable media. The method can include generating, at a master system, a first list of fulfillment nodes of fulfillment nodes in a fulfillment network, such that each fulfillment node in the first list of fulfillment nodes is enabled to deliver within a first shipping time period. The method also can include sending each fulfillment node in the first list of fulfillment nodes from the master system to a separate instance of a multi-threaded worker system as an input fulfillment node. The method additionally can include generating, at each separate instance of the multi-threaded worker system, a list of zip codes that the input fulfillment node can deliver to via ground shipping within the first shipping time period, based at least in part on preliminary eligibility information and an evaluation of current factors. The method further can include storing the lists of zip codes generated by the separate instances of the multi-threaded worker system in a database. The method additionally can include transforming, with an aggregator system, the lists of zip codes stored in the database to generate a mapping from each zip code in the lists of zip codes to a list of fulfillment nodes of the fulfillment nodes that can deliver via ground shipping to the each zip code within the first shipping speed. The method further can include storing the mapping in the database. The method additionally can include receiving a request including an input zip code and an input shipping time period. The method further can include generating a response to the request. The response can include a second list of fulfillment nodes based on the mapping stored in the database, such that each fulfillment node in the second list of fulfillment nodes can deliver to the input zip code via ground shipping within the input shipping time period.

Various embodiments can include a system including one or more processors and one or more non-transitory computer-readable media storing computing instructions configured to run on the one more processors and perform certain acts. The acts can include determining a zip code of a user using a web site that displays items for sale. The acts also can include receiving a selection by the user to display information about an item of the items for sale. The acts additionally can include retrieving first information including a predetermined geo-classification for the item. The acts further can include retrieving second information including a list of fulfillment nodes that can currently deliver to the zip code of the user within a first shipping speed via ground shipping. The acts additionally can include retrieving third information including a node-level inventory for the item. The acts further can include determining a shipping speed to display to the user for the item based on (a) the predetermined geo-classification for the item, (b) the list of fulfillment nodes that can currently deliver to the zip code of the user within the first shipping speed, and (c) the node-level inventory for the item. The acts additionally can include facilitating a display of the shipping speed to the user.

A number of embodiments can include a method being implemented via execution of computing instructions configured to run at one or more processors and stored at one or more non-transitory computer-readable media. The method can include determining a zip code of a user using a website that displays items for sale. The method also can include receiving a selection by the user to display information about an item of the items for sale. The method additionally can include retrieving first information including a predetermined geo-classification for the item. The method further can include retrieving second information including a list of fulfillment nodes that can currently deliver to the zip code of the user within a first shipping speed via ground shipping. The method additionally can include retrieving third information including a node-level inventory for the item. The method further can include determining a shipping speed to display to the user for the item based on (a) the predetermined geo-classification for the item, (b) the list of fulfillment nodes that can currently deliver to the zip code of the user within the first shipping speed, and (c) the node-level inventory for the item. The method additionally can include facilitating a display of the shipping speed to the user.

Although automatic determination of fulfillment nodes eligible for a specified shipping speed and/or automatic determination of a shipping speed to display for an item has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders, and/or one or more of the procedures, processes, or activities of FIGS. 4-6 may include one or more of the procedures, processes, or activities of another different one of FIGS. 4-6. As another example, the systems within web server 305, geo system 310, and/or zip service system 320 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   determining a zip code of a user using a website that displays items for sale, wherein determining the zip code of the user comprises determining the zip code of the user through at least one of using tracking cookies for the user using the website or geo-sniffing a current session of the user using the website;
   receiving a selection by the user to display information about an item of the items for sale;
   retrieving first information comprising a geo-classification for the item;
   determining second information comprising a list of fulfillment nodes that can currently deliver to the zip code of the user within a first shipping speed via ground shipping, comprising:
      generating a respective list of zip codes to which each of the fulfillment nodes can deliver via ground shipping within the first shipping speed based on current shipping factors; and
      transforming the respective lists of zip codes for the fulfillment nodes to the list of the fulfillment nodes that can currently deliver to the zip code of the user within the first shipping speed via ground shipping;
   retrieving third information comprising a node-level inventory for the item;
   determining a shipping speed to display to the user for the item based on (a) the geo-classification for the item, (b) the list of the fulfillment nodes that can currently deliver to the zip code of the user within the first shipping speed, and (c) the node-level inventory for the item; and
   facilitating a display of the shipping speed to the user, wherein:
      the geo-classification for the item is set to an always two-day classification at least when a sale margin for the item exceeds a first predetermined margin threshold;
      the geo-classification for the item is set to a never two-day classification at least when a size of the item exceeds a predetermined size threshold;
      the geo-classification for the item is set to a local geo classification at least when the sale margin of the item is less than a second predetermined margin threshold; and
      otherwise, the geo-classification for the item is set to a network geo classification.

2. The system of claim 1, wherein:
   generating the respective list of zip codes to which each of the fulfillment nodes can deliver via ground shipping within the first shipping speed further comprises:
      generating the respective lists of zip codes for each of the fulfillment nodes by respective instances of a multi-threaded process for each of the fulfillment nodes; and
   transforming the respective lists of zip codes to the list of the fulfillment nodes further comprises:
      creating, by a single-threaded aggregator, a reverse mapping of the respective lists of zip codes to generate the list of the fulfillment nodes that can currently deliver to the zip code of the user.

3. The system of claim 1, wherein:
   the node-level inventory for the item comprises a second list of the fulfillment nodes that currently carry the item.

4. The system of claim 1, wherein:
   the first shipping speed is two days.

5. The system of claim 1, wherein when the geo-classification for the item is an always two-day classification:
   setting the shipping speed to two-day shipping when the node-level inventory for the item includes at least one fulfillment node that is in a two-day enabled fulfillment node;
   otherwise setting the shipping speed to three to five-day shipping when the node-level inventory for the item includes at least one fulfillment node; and
   otherwise setting an availability of the item to unavailable.

6. The system of claim 1, wherein when the geo-classification for the item is a never two-day classification:
setting the shipping speed to three to five-day shipping when the node-level inventory for the item includes at least one fulfillment node; and
otherwise setting an availability of the item to unavailable.

7. The system of claim 1, wherein when the geo-classification for the item is a network geo classification:
setting the shipping speed to two-day shipping when the first shipping speed is two days and the list of the fulfillment nodes in the second information includes one or more fulfillment nodes that match one or more fulfillment nodes in the node-level inventory for the item;
otherwise setting the shipping speed to three to five-day shipping when the node-level inventory for the item includes at least one fulfillment node; and
otherwise setting an availability of the item to unavailable.

8. The system of claim 1, wherein when the geo-classification for the item is a local geo classification:
setting the shipping speed to two-day shipping when the first shipping speed is two days and the list of the fulfillment nodes in the second information includes one or more fulfillment nodes that match one or more fulfillment nodes in the node-level inventory for the item;
otherwise setting the shipping speed to three to five-day shipping when the node-level inventory for the item includes at least one fulfillment node that is local geo discoverable; and
otherwise setting an availability of the item to unavailable.

9. The system of claim 1, wherein:
the current shipping factors comprise: (a) pickup calendars for carriers at the each of the fulfillment nodes, (b) delivery calendars for the carriers, (c) capacities of the carriers to handle additional orders, (d) a capacity of the each of the fulfillment nodes to handle additional orders, and (e) a processing time for the each of the fulfillment nodes; and
the respective lists of zip codes are generated by separate instances of a multi-threaded worker system at least every 15 minutes based on the current shipping factors.

10. The system of claim 1, wherein:
the shipping speed is displayed to the user in an item page for the item.

11. A method being implemented via execution of computing instructions configured to run at one or more processors and stored at one or more non-transitory computer-readable media, the method comprising:
determining a zip code of a user using a website that displays items for sale, wherein determining the zip code of the user comprises determining the zip code of the user through at least one of using tracking cookies for the user using the website or geo-sniffing a current session of the user using the website;
receiving a selection by the user to display information about an item of the items for sale;
retrieving first information comprising a geo-classification for the item;
determining second information comprising a list of fulfillment nodes that can currently deliver to the zip code of the user within a first shipping speed via ground shipping, comprising:
generating a respective list of zip codes to which each of the fulfillment nodes can deliver via ground shipping within the first shipping speed based on current shipping factors; and
transforming the respective lists of zip codes for the fulfillment nodes to the list of the fulfillment nodes that can currently deliver to the zip code of the user within the first shipping speed via ground shipping;
retrieving third information comprising a node-level inventory for the item;
determining a shipping speed to display to the user for the item based on (a) the geo-classification for the item, (b) the list of the fulfillment nodes that can currently deliver to the zip code of the user within the first shipping speed, and (c) the node-level inventory for the item; and
facilitating a display of the shipping speed to the user,
wherein:
the geo-classification for the item is set to an always two-day classification at least when a sale margin for the item exceeds a first predetermined margin threshold;
the geo-classification for the item is set to a never two-day classification at least when a size of the item exceeds a predetermined size threshold;
the geo-classification for the item is set to a local geo classification at least when the sale margin of the item is less than a second predetermined margin threshold; and
otherwise, the geo-classification for the item is set to a network geo classification.

12. The method of claim 11, wherein:
generating the respective list of zip codes to which each of the fulfillment nodes can deliver via ground shipping within the first shipping speed further comprises:
generating the respective lists of zip codes for each of the fulfillment nodes by respective instances of a multi-threaded process for each of the fulfillment nodes; and
transforming the respective lists of zip codes to the list of the fulfillment nodes further comprises:
creating, by a single-threaded aggregator, a reverse mapping of the respective lists of zip codes to generate the list of the fulfillment nodes that can currently deliver to the zip code of the user.

13. The method of claim 11, wherein:
the node-level inventory for the item comprises a second list of the fulfillment nodes that currently carry the item.

14. The method of claim 11, wherein:
the first shipping speed is two days.

15. The method of claim 11, wherein when the geo-classification for the item is an always two-day classification:
setting the shipping speed to two-day shipping when the node-level inventory for the item includes at least one fulfillment node that is in a two-day enabled fulfillment node;
otherwise setting the shipping speed to three to five-day shipping when the node-level inventory for the item includes at least one fulfillment node; and
otherwise setting an availability of the item to unavailable.

16. The method of claim 11, wherein when the geo-classification for the item is a never two-day classification:

setting the shipping speed to three to five-day shipping when the node-level inventory for the item includes at least one fulfillment node; and otherwise setting an availability of the item to unavailable.

17. The method of claim 11, wherein when the geo-classification for the item is a network geo classification:

setting the shipping speed to two-day shipping when the first shipping speed is two days and the list of the fulfillment nodes in the second information includes one or more fulfillment nodes that match one or more fulfillment nodes in the node-level inventory for the item;

otherwise setting the shipping speed to three to five-day shipping when the node-level inventory for the item includes at least one fulfillment node; and otherwise setting an availability of the item to unavailable.

18. The method of claim 11, wherein when the geo-classification for the item is a local geo classification:

setting the shipping speed to two-day shipping when the first shipping speed is two days and the list of the fulfillment nodes in the second information includes one or more fulfillment nodes that match one or more fulfillment nodes in the node-level inventory for the item;

otherwise setting the shipping speed to three to five-day shipping when the node-level inventory for the item includes at least one fulfillment node that is local geo discoverable; and otherwise setting an availability of the item to unavailable.

19. The method of claim 11, wherein:

the current shipping factors comprise: (a) pickup calendars for carriers at the each of the fulfillment nodes, (b) delivery calendars for the carriers, (c) capacities of the carriers to handle additional orders, (d) a capacity of the each of the fulfillment nodes to handle additional orders, and (e) a processing time for the each of the fulfillment nodes; and the respective lists of zip codes are generated by separate instances of a multi-threaded worker system at least every 15 minutes based on the current shipping factors.

20. The method of claim 11, wherein:

the shipping speed is displayed to the user in an item page for the item.

* * * * *